Patented June 12, 1928.

1,673,672

UNITED STATES PATENT OFFICE.

WILLIS A. GIBBONS, OF GREAT NECK, AND JOHN McGAVACK, OF JACKSON HEIGHTS, NEW YORK, ASSIGNORS TO UNITED STATES RUBBER PLANTATIONS, INCORPORATED, OF NEW YORK, N. Y., A CORPORATION OF NEW YORK.

METHOD OF TREATING LATEX AND THE PRODUCTS OBTAINED THEREFROM.

No Drawing.      Application filed May 11, 1927. Serial No. 190,644.

The present invention relates to a new method of treating latex and to the products obtained therefrom.

In the use of latex and also in the use of the rubber derived therefrom by processes in which the total solid contents of the latex are retained, the presence of the protein constituents in unchanged condition, or in the consequence of the use of a basic preservative, is for some purposes objectionable. It is therefore one object of the present invention to subject latex to a treatment which will modify these protein constituents to obviate the difficulties heretofore experienced as a result of their presence.

The objects and advantages of the invention will best appear by a statement of various examples embodying the invention as follows:

In order to produce a rubber of remarkably white or translucent characteristics, a decomposition of the protein constituents of the latex is first effected. This may be done in various ways, as by the addition of small quantities of digesting material, such as pepsin, trypsin or papain, one or another of these digesting materials being used, depending upon whether the latex is alkaline or acid. Immediately after collection latex is acid unless an alkali, such as ammonia, for instance, is added at the time of collection. Decomposition may also be effected by the introduction of small quantities of fecal matter, putrid latex, or simply by permitting the latex to naturally decompose, as will result if it is left without preservative for any considerable length of time.

*Example 1.*—In the usual rubber plantation practice the latex collections of the large number of coolies employed are bulked together in a collecting tank within a short time of collection from the trees. Preferably a solution of material which will stabilize the latex against coagulation resulting from changes in the latex, including those brought about by the bacteria present, is first placed in the collecting tank and the latex added to this solution, which may be one of various materials, such as potassium or sodium salt of sulphonated undecylinic acid, the resultant product of naphthalene and isopropyl alcohol when treated with sulphuric acid, or generally any material which decreases the interfacial tension on the acid side. In practice a ten per cent (10%) solution of the sodium salt of sulphonated undecylinic acid, is placed in the collecting tank, the amount of the acid being about five per cent (5%) on the rubber content of the latex. Latex does not coagulate of itself, although the decomposition of the protein matters takes place. In practice the latex is left for forty-eight (48) hours, at which time it is believed that practically complete decomposition of the proteins has taken place, although in some instances the latex has been left as long as five days in order to permit of decomposition of the proteins. At the end of this period the latex shows a pH of from 4.5 to 5. This latex may then be subjected to a spray desiccation process to produce the crude rubber, substantially according to the invention of Patent No. 1,423,525, dated July 25, 1922. The result is a remarkably light-colored rubber with translucent characteristics.

*Example 2.*—In this example the latex is allowed to decompose as in Example 1, but at an appropriate stage of the decomposition period an antiseptic is added. For instance, after the proteins of the latex have decomposed from one to five or six days, .3 per cent of formaldehyde, computed on the latex, is added thereto, preferably in the form of a 38 per cent (38%) solution. Within an hour of the addition of formaldehyde, all putrid odor has disappeared, and the latex is stable as against coagulation either by mechanical of bacterial action. This latex may be sprayed or subjected to any evaporation treatment whereby practically all, or a portion, of the water is eliminated. In the spray process the liquid contents are usually evaporated to a point at which the resulting crude rubber shows a moisture content of under one per cent (1%), but it will be understood that the latex may be subjected to an evaporation process whereby it is concentrated without producing coagulation, and such concentration may be carried to a very high degree. The dry rubber resulting from this latex is acid, and although not so light as the rubber produced by Example 1, is much softer to break down on the mills. Of course the percentages of the mechanical stabilizer and the antiseptic, such as formaldehyde, may be varied, depending upon the use to which the latex is to be put. If the latex is to be immediately sprayed, a small quantity of these materials will be sufficient, but if the latex is to be stored for long periods of time, such as is necessary for shipment from the East, the percentages will be larger, and it has been found that by doubling the percentage of the mechanical stabilizer a latex is obtained which is remarkably resistant to all coagulating processes. Another feature of this rubber is that in the decomposition of the proteins, amino products are obtained, and upon the addition of formaldeyhde there is probably a condensation action between the formaldehyde and the amino products, which results in the creation of materials accelerating vulcanization.

*Example 3.*—There is associated with the latex having a rubber content of around thirty-five per cent (35%) about .75 of one per cent (.75 of 1%) (on the rubber content) of the sodium salt of sulphonated undecylinic acid in the form of a ten per cent solution. This latex is then allowed to decompose and .3 per cent (on the latex) of formaldehyde is added, and then .5 to 2 per cent (on the rubber content) of phosphoric acid, or 1 to 2 per cent (on the rubber content) of picric acid is added, so that the degree of acidity will be increased for the purpose of producing a tacky, soft rubber, easy to break down and having good milling and calendering properties, and at the same time producing a marked improvement in the physical characteristics of the vulcanized product, particularly in the characteristic of withstanding flexing when used as the layer of rubber between the fabric plies of a tire.

*Example 4.*—Latex is treated as in Example 3, except that in substitution for, or in addition to, the acid employed in Example 3, up to five per cent (5%) of cresol is added to the latex.

*Example 5.*—Instead of effecting or permitting decomposition of the protein constituents in the latex, the mechanical stabilizer referred to in the foregoing example may be associated with the latex at the collecting station, and the formaldehyde or other antiseptic may be added at the same time, together with the acids—phosphoric, picric, acetic—and/or cresol, and the resulting latex concentrated by an evaporation method so as to produce an uncoagulated latex which may be later diluted; or the latex may be subjected to the spray desiccation process referred to above, or to any other method for the production of crude rubber in which method substantially all of the non-rubber constituents are retained.

It will be understood that by "decomposition" is meant here any bio-chemical action which brings about a chemical change in the protein constituents of the latex.

The latex which has been subjected to the processes hereinbefore described, involving the decomposition of the protein consituents, contains substantially all the original solid contents of the latex, but with at least the protein constituents so changed that a film derived from this latex is easily distinguishable from a dried film made from latex in which the protein constituents have not been decomposed. If a film of latex treated according to the present invention is laid on a glass plate, upon drying the surface is pitted and irregular, whereas with a film of rubber from latex in which the protein constituents have not been decomposed, the surface is perfectly smooth. Moreover, the film of rubber from latex made according to the present invention is more transparent than films from latex having undecomposed proteins. No doubt there are other tests which would distinguish both the latex and the rubber made according to the present invention.

Having thus described our invention, what we claim and desire to protect by Letters Patent is:

1. A process of treating latex which consists in adding a material which prevents coagulation but permits baterial action, allowing the latex to stand until the protein constituents of the latex are substantially decomposed, then subjecting the latex to an evaporating process.

2. A process of treating latex which consists in adding a material which prevents coagulation but permits bacterial action, allowing the latex to stand until the protein constituents of the latex are substantially decomposed, and then adding a material to prevent further bacterial action.

3. A process of treating latex which consists in adding a material which prevents coagulation but permits bacterial action, allowing the latex to stand until the protein constituents of the latex are substantially decomposed, adding a material to prevent further bacterial action, and then subjecting the latex to an evaporating process.

4. A process of treating latex which consists in adding a material which prevents coagulation but permits bacterial action, allowing the latex to stand until the protein constituents of the latex are substantially decomposed, then adding an acid to the latex and subjecting the same to an evaporating process.

5. A process of treating latex which consists in adding a material which prevents coagulation but permits bacterial action, allowing the latex to stand until the protein constituents of the latex are substantially decomposed, then adding an acid and a material to prevent further bacterial action.

6. An uncoagulated latex with its protein constituents decomposed, characterized by the fact that a dried film from the latex has a pitted surface and is substantially transparent.

7. A crude rubber containing substantially the entire solid contents of the original latex from which it was made, and characterized by the fact that the protein constituents have been decomposed.

Signed at New York, county and State of New York, this 9th day of May, 1927.

WILLIS A. GIBBONS.

Signed at New York, county and State of New York, this 9th day of May, 1927.

JOHN McGAVACK.